United States Patent
Perriello et al.

(10) Patent No.: US 8,160,657 B2
(45) Date of Patent: Apr. 17, 2012

(54) MOBILE WIRELESS COMMUNICATIONS DEVICE WITH ELASTOMERIC SEALING MEMBRANE COVERING SWITCH AND RELATED METHODS

(75) Inventors: Richard Perriello, Rochester, NY (US); Daniel Rice, Marion, NY (US); Raymond Chapman, Fairport, NY (US)

(73) Assignee: Harris Corporation, Melbourne, FL (US)

( * ) Notice: Subject to any disclaimer, the term of this patent is extended or adjusted under 35 U.S.C. 154(b) by 474 days.

(21) Appl. No.: 12/508,732

(22) Filed: Jul. 24, 2009

(65) Prior Publication Data

US 2011/0021164 A1 Jan. 27, 2011

(51) Int. Cl.
*H04M 1/00* (2006.01)
*H01H 13/06* (2006.01)

(52) U.S. Cl. .................. 455/575.1; 455/899; 200/302.2; 200/302.1; 200/302.3

(58) Field of Classification Search .............. 455/575.1, 455/90.3; 200/302.1, 302.2, 302.3
See application file for complete search history.

(56) References Cited

U.S. PATENT DOCUMENTS

| | | | | |
|---|---|---|---|---|
| 3,959,610 A * | 5/1976 | Finnegan et al. | ............ | 200/5 A |
| 4,170,104 A * | 10/1979 | Yamagata | ............ | 368/289 |
| 4,218,602 A * | 8/1980 | Creech | ............ | 200/302.3 |
| 4,609,791 A | 9/1986 | Abbat | ............ | 200/5 A |
| 4,980,522 A * | 12/1990 | Murakami et al. | ............ | 200/5 A |
| 5,144,103 A * | 9/1992 | Suwa | ............ | 200/344 |
| 5,219,067 A * | 6/1993 | Lima et al. | ............ | 200/302.2 |
| 5,258,592 A * | 11/1993 | Nishikawa et al. | ............ | 200/302.2 |
| 5,270,499 A | 12/1993 | Marchuk et al. | ............ | 200/5 A |
| 5,367,133 A | 11/1994 | Schmidt et al. | ............ | 200/5 A |
| 5,564,560 A | 10/1996 | Minelli et al. | ............ | 200/516 |
| 5,674,018 A | 10/1997 | Kaufman et al. | ............ | 400/473 |
| 5,704,467 A | 1/1998 | Jarvis | ............ | 200/302.2 |
| 5,734,136 A * | 3/1998 | Newcomer et al. | ............ | 200/5 A |
| 5,768,369 A | 6/1998 | Zoiss et al. | ............ | 379/433 |
| 5,821,482 A * | 10/1998 | Ootani et al. | ............ | 200/5 A |
| 6,501,036 B2 * | 12/2002 | Rochon et al. | ............ | 200/302.2 |
| 6,621,024 B1 * | 9/2003 | Bello | ............ | 200/302.2 |
| 7,041,924 B2 | 5/2006 | Jeschke et al. | ............ | 200/302.2 |
| 7,230,195 B2 * | 6/2007 | Ohnishi | ............ | 200/302.1 |
| 7,249,861 B2 | 7/2007 | Coleman et al. | ............ | 362/24 |
| 7,355,137 B2 * | 4/2008 | Kawasaki et al. | ............ | 200/302.2 |

(Continued)

FOREIGN PATENT DOCUMENTS

| | | |
|---|---|---|
| GB | 2219691 | 12/1989 |
| GB | 2437388 | 10/2007 |

*Primary Examiner* — Duc M Nguyen
(74) *Attorney, Agent, or Firm* — Allen, Dyer, Doppelt, Milbrath & Gilchrist, P.A.

(57) ABSTRACT

A mobile wireless communications device may include a housing having an opening therein and an inwardly extending housing ring adjacent the opening, and a switch carried by the housing and being aligned with the opening. The mobile wireless communications device may further include a backing member within the housing adjacent the opening, and an elastomeric switch membrane comprising a body covering the switch, and a flange coupled to the body and compressed between the backing member and the housing ring to define a seal therewith. The flange may include a flange base, and a pair of flange rings extending inwardly from the flange base and defining a valley therebetween aligned with the housing ring. In another embodiment, the flange may include a flange base and a first flange ring on a first surface thereof, and a pair of second flange rings on a second surface of the flange base and defining a valley therebetween aligned with the first flange ring.

34 Claims, 11 Drawing Sheets

U.S. PATENT DOCUMENTS

| | | | |
|---|---|---|---|
| 7,365,281 B2 * | 4/2008 | Yamaguchi et al. | 200/302.1 |
| 7,435,922 B1 | 10/2008 | Wittig et al. | 200/516 |
| 7,449,642 B1 | 11/2008 | Wu et al. | 200/5 A |
| 2004/0069658 A1 | 4/2004 | Jeschke | 206/37.1 |
| 2005/0140255 A1 | 6/2005 | Wilson | 312/223.4 |
| 2009/0114516 A1 | 5/2009 | Wu et al. | 200/5 A |
| 2009/0115640 A1 | 5/2009 | Wu et al. | 341/22 |

* cited by examiner

MOBILE WIRELESS COMMUNICATIONS DEVICE WITH ELASTOMERIC SEALING MEMBRANE COVERING SWITCH AND RELATED METHODS

FIELD OF THE INVENTION

The present invention relates to the field of mobile wireless communications devices, and, more particularly, to the elastomeric sealing membranes for switches in mobile wireless communications devices and related methods.

BACKGROUND OF THE INVENTION

Mobile communications devices have become an integral part of society over the last two decades. Indeed, more than eighty-two percent of Americans own a mobile communications device, for example, a cell phone. The typical mobile communications device includes an antenna, and a transceiver coupled to the antenna. The transceiver and the antenna cooperate to transmit and receive communication signals.

The typical mobile communications device includes a plurality of switches for permitting the user to operate the device conveniently. For example, the switches may be arranged in the traditional keypad orientation, i.e. a numeric keypad or utility keypad on the side of the device. The switches are coupled to a circuit board within the device and are carried by the housing of the mobile communications device, extending through openings in the housing. Since the typical user subjects the mobile communications device to a wide variety of environmental conditions, manufacturers typically enclose the switches with a sealing membrane made of, for example, rubber or silicone. The sealing membrane not only seals the switches within the housing but also provides a good tactile surface for the user to manipulate.

An approach to the sealing membrane is disclosed in U.S. Pat. No. 5,270,499 to Marchuk et al. This sealing membrane includes a body portion covering the respective switch, and a flange portion coupled thereto and being compressed by a front grill and a housing for the device, thereby defining a seal. The flange portion is V-shaped and, while compressed, provides an area of high-pressure.

In some applications, it may be desirable to provide a mobile communications device that can reliably operate in humid and wet environments, for example, underwater environments. In these applications, the housing of the device provides a waterproof barrier and any openings, for example, those provided for access to switches, are sealed to be watertight, i.e. the sealing membrane provides a watertight seal. Further, in these applications, the typical sealing membrane may include a flange portion installed into the device using adhesive material adjacent the flange portion to create the watertight seal.

This adhesive material approach may suffer from certain drawbacks. For example, the adhesive material may deteriorate over time, thereby causing the watertight seal to fail after a certain period of use. This can be especially problematic for the user if this failure occurs in the field since the mobile communications device will likely fail to operate. Moreover, during manufacturing, the application of the adhesive material is a time intensive process that adds cost to manufacturing. Moreover, the quality of the watertight seal provided by the adhesive material is directly related to the integrity of its continuous and consistent application during manufacture, which can provide a less than desirable yield rate. Also, if the mobile communications device needs to be serviced, the adhesive material is typically removed or destroyed to open the device, thereby adding cost and time to the repair process. Lastly, the adhesive material approach may not provide a watertight seal in depths greater than twenty meters.

SUMMARY OF THE INVENTION

In view of the foregoing background, it is therefore an object of the present invention to provide a mobile wireless communications device with an elastomeric switch membrane that provides a reliable seal with the housing.

This and other objects, features, and advantages in accordance with the present invention are provided by a mobile wireless communications device that may comprise a housing having an opening therein and an inwardly extending housing ring adjacent the opening, at least one switch carried by the housing and being aligned with the opening, a backing member within the housing adjacent the opening, and an elastomeric switch membrane comprising a body covering the at least one switch, and a flange coupled to the body and compressed between the backing member and the housing ring to define a seal therewith. The flange may include a flange base, and a pair of flange rings extending inwardly from the flange base and defining a valley therebetween aligned with the housing ring. Advantageously, this elastomeric switch membrane is easily installed into the mobile wireless communications device and provides a strong watertight seal with the housing. More specifically, the flange may be compressed between the backing member and the housing ring to define the seal without adhesive material.

In some embodiments, the pair of flange rings may comprise an inner flange ring and an outer flange ring, each having a respective height, and the outer flange ring may have a height greater than a height of the inner flange ring. In other embodiments, the inner flange ring and the outer flange ring may each have respective identical heights.

In some embodiments, the housing ring may have a rounded tip compressing the flange. In other embodiments, the housing ring may have a plateaued tip compressing the flange. More particularly, the flange base may have a rounded corner portion, and the housing may have a recess shaped to receive the rounded corner portion therein. In some embodiments, the elastomeric switch membrane may comprise an integrally molded monolithic unit. For example, the at least one switch may comprise an array thereof. Additionally, the at least one switch may comprise at least one push-to-talk (PTT) switch.

Another aspect is directed to a mobile wireless communications device that may comprise a housing having an opening therein, at least one switch carried by the housing and being aligned with the opening, a backing member within the housing adjacent the opening, and an elastomeric switch membrane comprising a body covering the at least one switch, and a flange coupled to the body and compressed between the backing member and adjacent portions of the housing to define a seal therewith. The flange may comprise a flange base and a first flange ring on a first surface thereof, and a pair of second flange rings on a second surface of the flange base and defining a valley therebetween aligned with the first flange ring. Further, the flange may be compressed between the backing member and the adjacent portions of the housing to define the seal without adhesive material.

In some embodiments, the first flange ring may contact the backing member, and the pair of second flange rings may contact the adjacent portions of the housing. In other embodiments, the pair of second flange rings may contact the backing member, and the first flange ring may contact the adjacent portions of the housing. For example, each flange ring may have a respective identical height.

Another aspect is directed to a method of making a mobile wireless communications device that may comprise forming a housing having an opening therein and an inwardly extending housing ring adjacent the opening. The method may further include forming an elastomeric switch membrane comprising a body to cover at least one switch aligned with the opening, and a flange coupled to the body and comprising a flange base, and a pair of flange rings extending inwardly from the flange base and defining a valley therebetween aligned with the housing ring. The method may further include compressing the flange between a backing member and the housing ring to define a seal therewith.

Another aspect is directed to a method of making a mobile wireless communications device that may comprise forming a housing having an opening therein. The method may further include forming an elastomeric switch membrane comprising a body to cover at least one switch aligned with the opening, and a flange coupled to the body and comprising a flange base and a first flange ring on a first surface thereof, and a pair of second flange rings on a second surface of the flange base and defining a valley therebetween aligned with the first flange ring. The method may further include compressing the flange between a backing member and adjacent portions of the housing to define a seal therewith.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple prime notations are used to indicate similar elements in alternative embodiments.

Figure 1:
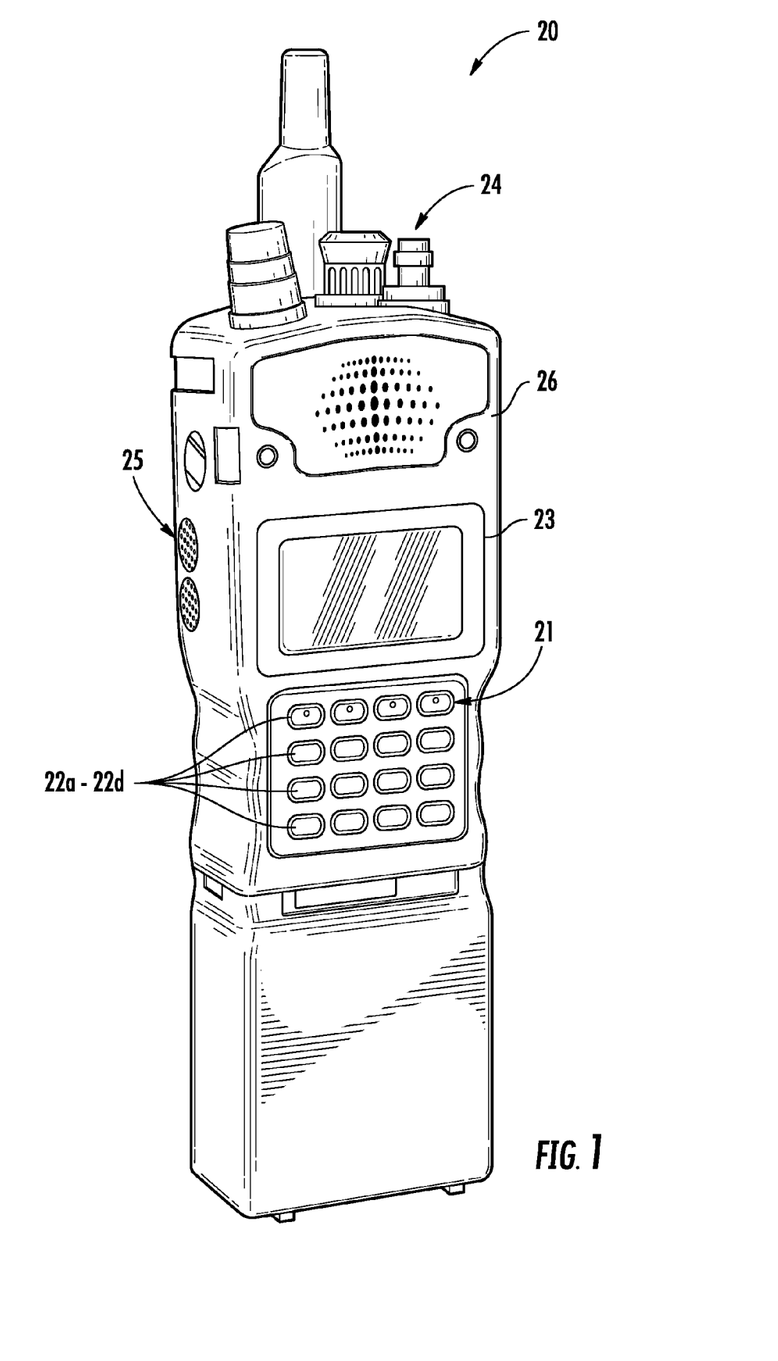
FIG. 1 is a perspective view of the mobile wireless communications device, according to the present invention.
Figure 2:
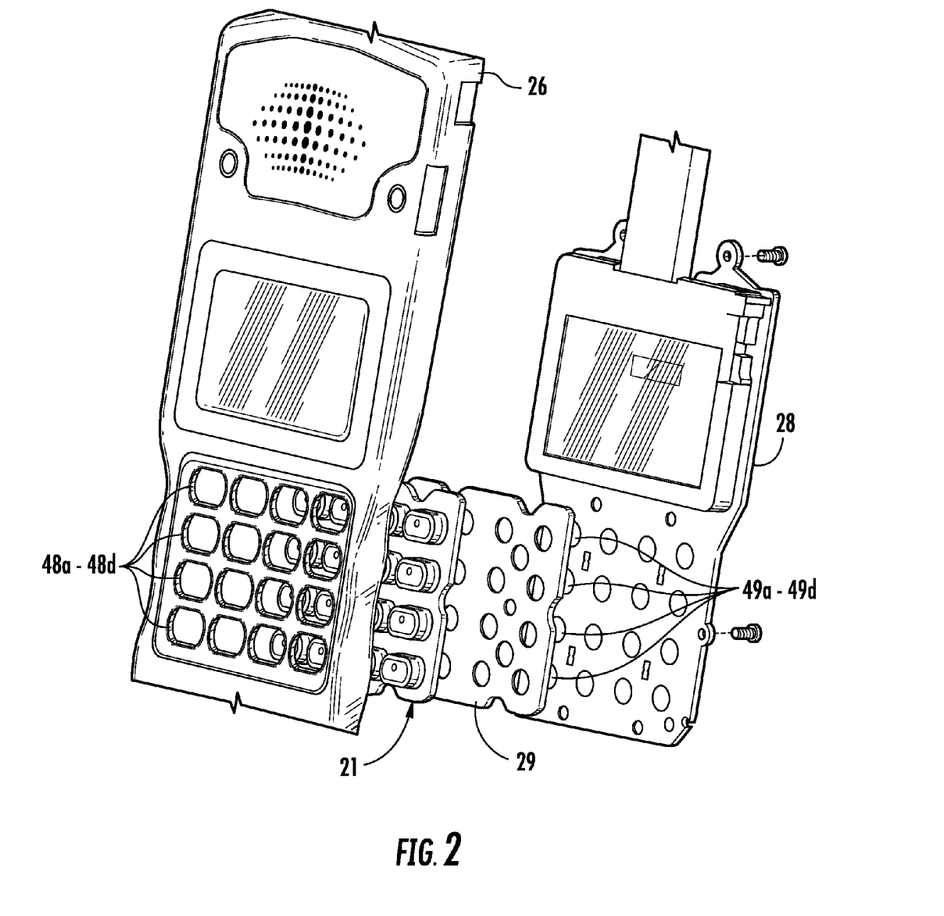
FIG. 2 is an exploded view of the front panel of the mobile wireless communications device of FIG. 1.

Referring initially to FIGS. 1-2, a mobile wireless communications device 20 according to the present invention is now described. The mobile wireless communications device 20 illustratively includes a housing 26, an antenna array 24 carried by the housing, and a display 23 also carried by the housing. The antenna array 24 may include at least one of, for example, a Worldwide Interoperability for Microwave Access (WiMAX) antenna, a global positioning system (GPS) antenna, and a very high frequency (VHF) antenna. The mobile wireless communications device 20 also illustratively includes a push-to-talk (PTT) control pad 25 and a numeric keypad 21 including a plurality/array of elastomeric switch membranes 22a-22d for the respective keys, for example, for representing numerals 0-9 and symbols * and #. The mobile wireless communications device 20 illustratively includes a circuit board 28 (FIG. 2) carried by the housing 26. The circuit board 28 illustratively includes a plurality of switches 49a-49d installed thereon.

Each elastomeric switch membrane 22a-22d may be formed from rubber or silicone, for example. In certain embodiments, the elastomeric switch membrane 22a-22d may comprise an integrally molded monolithic unit.

The housing 26 illustratively includes a plurality of openings 48a-48d therein. The plurality of switches 49a-49d carried by the housing 26 are illustratively aligned with the openings 48a-48d for providing access to the user of the mobile wireless communications device 20. The mobile wireless communications device 20 also illustratively includes a spacer 29, for example, a plastic spacer, between the circuit board 28 and the keypad 21.

Figure 3A:
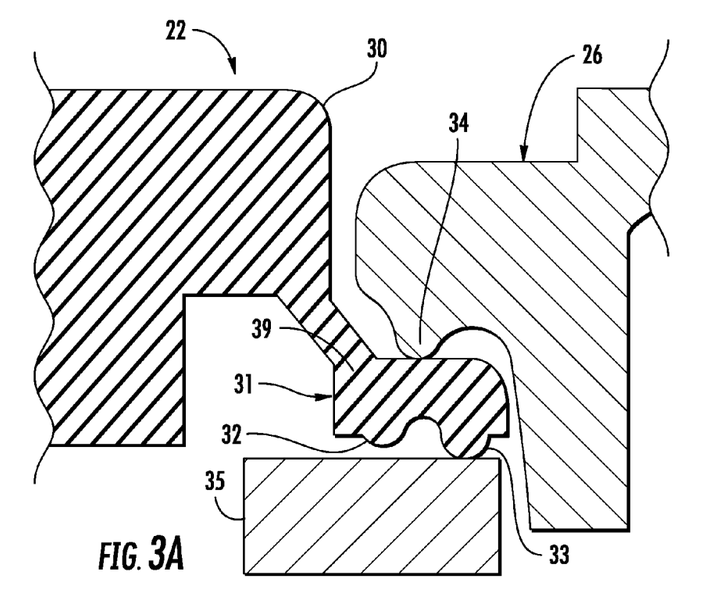
FIG. 3A is a cross-sectional view of a portion of the elastomeric switch membrane of FIG. 2 in an uncompressed state.
Figure 3B:
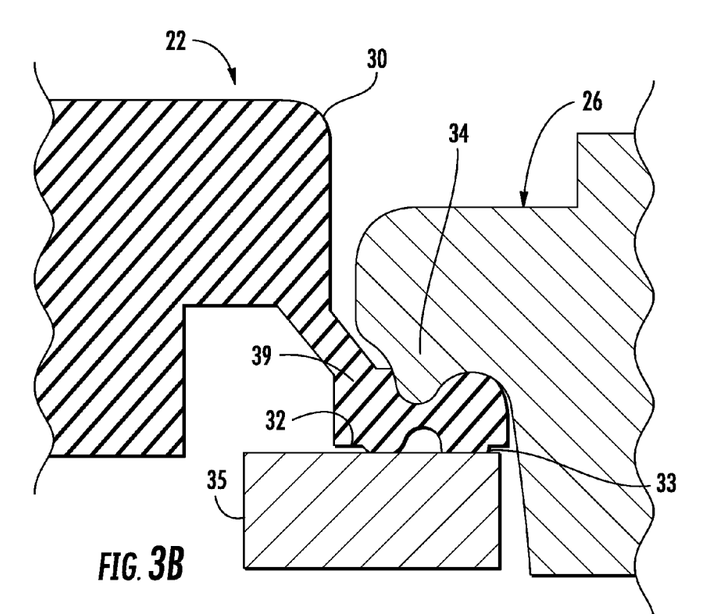
FIG. 3B is a cross-sectional view of a portion of the elastomeric switch membrane of FIG. 2 in a compressed state.

Referring now additionally to FIGS. 3A and 3B, the housing 26 illustratively includes an inwardly extending housing ring 34 adjacent the openings 48a-48d. The housing ring 34 illustratively is formed from a metal material, for example, but other materials possessing sufficient hardness may be used. As illustrated, the housing ring 34 extends around the perimeter of the openings 48a-49d. The mobile wireless communications device 20 illustratively includes a backing member 35 within the housing 26 adjacent the openings 48a-48d. Additionally, the backing member 35 illustratively is formed from a metal material, for example, but other materials possessing sufficient hardness may be used. As will be appreciated by those skilled in the art, the backing member 35 may be installed onto the circuit board 28 or be provided by some form of plastic spacer.

In the illustrated embodiment, each elastomeric switch membrane 22a-22d on the perimeter of the keypad 21 illustratively includes a body 30 covering the respective switch 49a-49d, and a flange 31 coupled to the body and compressed between the backing member 35 and the housing ring 34 to define a seal therewith. The housing ring 34 illustratively includes a rounded tip for providing sufficient vertical compression of the flange 31. As will be appreciated by those skilled in the art, the height of the housing ring 34 may be varied based upon the thickness of the flange 31 and the size of the opening in the housing 26. The flange 31 illustratively includes a flange base 39, and a pair of flange rings 32-33 extending inwardly from the flange base and defining a valley therebetween aligned with the housing ring 34. As will be appreciated by those skilled in the art, and perhaps as best seen in FIG. 3B, when the mobile wireless communications device 20 is assembled, the flange 31 of the elastomeric switch membrane 22a-22d is compressed between the housing 26, via the housing ring's 34 rounded tip, and the backing member 35.

Although the illustrated embodiment includes a plurality of elastomeric switch membranes 22a-22d and corresponding openings 48a-48d, in other embodiments, the keypad 21 may include as few as one elastomeric switch membrane, and the housing 26 may include a single corresponding opening.

Advantageously, the elastomeric switch membrane 22a-22d provides a strong watertight seal with the housing 26 that maintains integrity at significant depths. Moreover, the seal is provided without using adhesive material, as in the typical elastomeric switch membrane.

Furthermore, the pair of flange rings 32-33 illustratively includes an inner flange ring 32 and an outer flange ring 33, each having a respective height measured from an inner surface of the flange 31. In this embodiment, the respective height of the outer flange ring 33 is greater than the respective height of the inner flange ring 32.

More particularly, while compressed, as perhaps best seen in FIG. 3B, the flange base 39 illustratively includes a rounded corner portion. The housing 26 illustratively includes a recess shaped to receive the rounded corner portion therein.

Figure 4A:
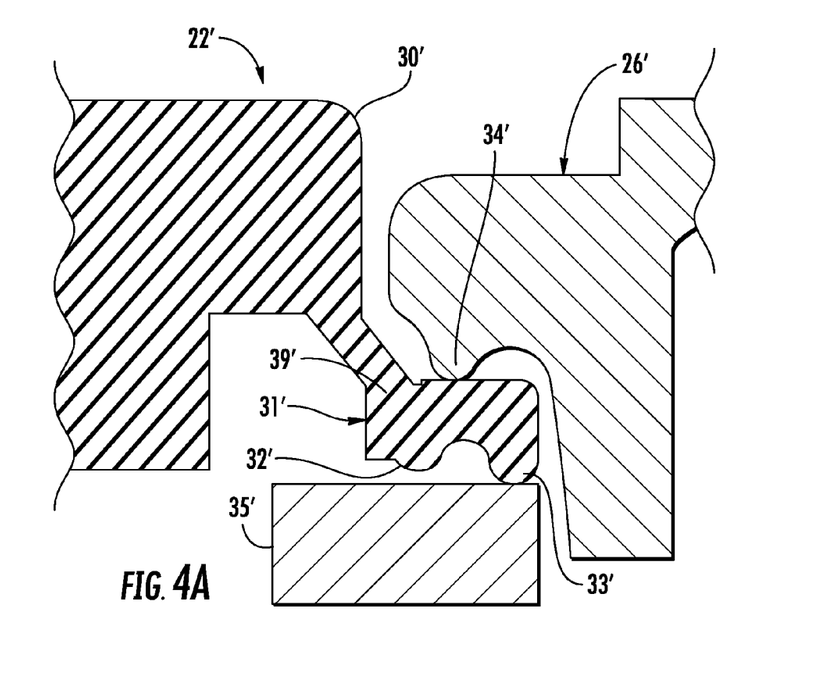
FIG. 4A is a cross-sectional view of a portion of another embodiment of the elastomeric switch membrane according to the present invention in an uncompressed state.
Figure 4B:
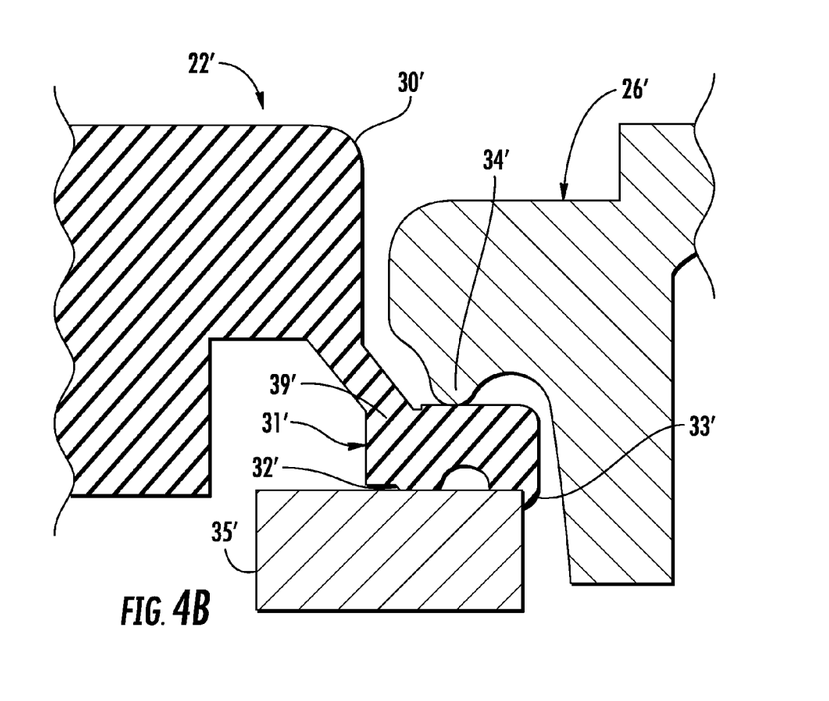
FIG. 4B is a cross-sectional view of a portion of another embodiment of the elastomeric switch membrane according to the present invention in a compressed state.

Referring now to FIGS. 4A and 4B, another embodiment of the wireless communications device 20' is now described. In this embodiment of the wireless communications device 20', those elements already discussed above with respect to FIGS. 1-3B are given prime notation and most require no further discussion herein. This embodiment differs from the previous embodiment in that the flange 31' includes an outer flange ring 33' that is flush with an edge of the flange base 39'. This embodiment differs from the previous embodiment in that the flange 31' includes an upper (outer) surface that is raised. Moreover, and perhaps as best seen in FIG. 4B, the flange 31' is illustratively compressed between the backing member 35' and the housing ring 34' to define the seal without adhesive material.

Figure 5A:
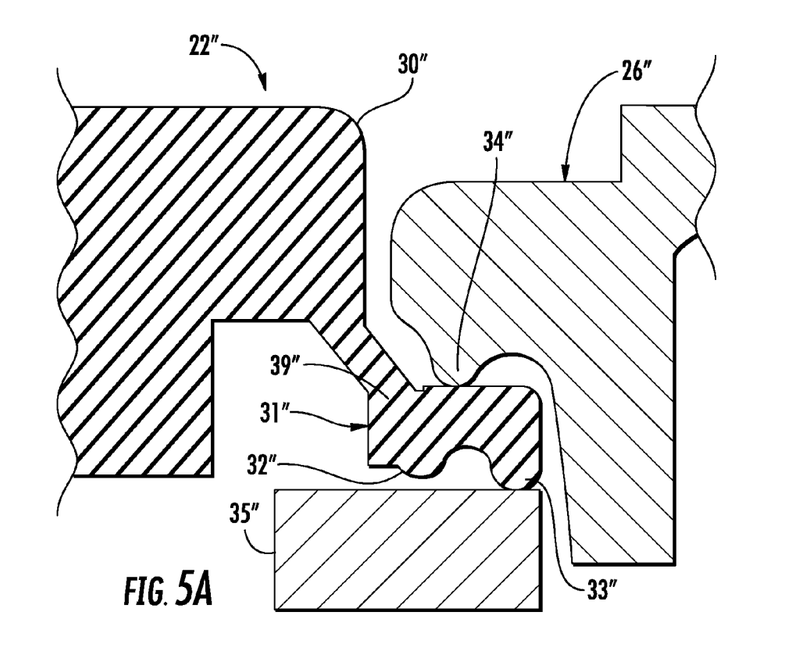
FIG. 5A is a cross-sectional view of a portion of another embodiment of the elastomeric switch membrane according to the present invention in an uncompressed state.
Figure 5B:
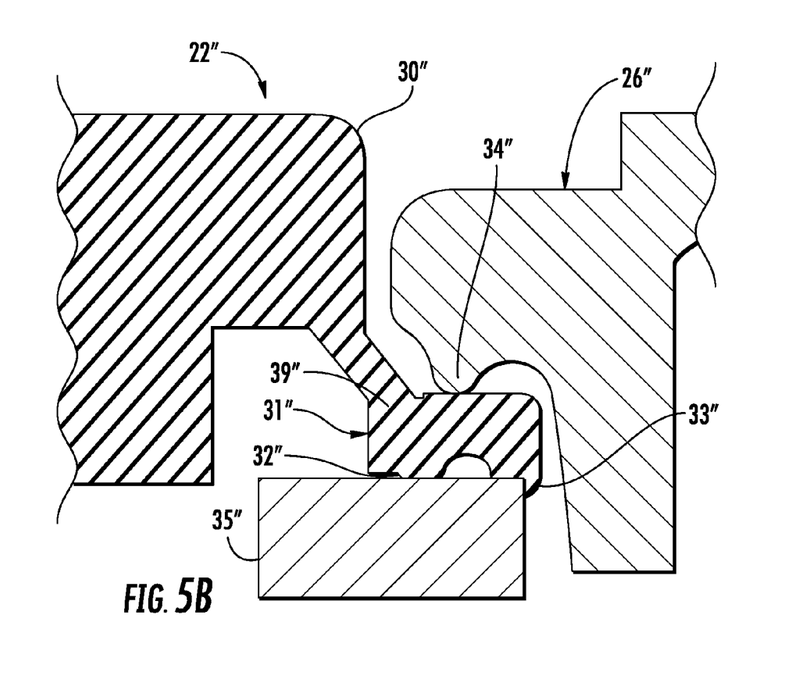
FIG. 5B is a cross-sectional view of a portion of another embodiment of the elastomeric switch membrane according to the present invention in a compressed state.

Referring now to FIGS. 5A and 5B, another embodiment of the wireless communications device 20" is now described. In this embodiment of the wireless communications device 20", those elements already discussed above with respect to FIGS. 1-3B are given double prime notation and most require no further discussion herein. This embodiment differs from the previous embodiment in that the flange 31" includes an outer flange ring 33" that is flush with an edge of the flange base 39". Further, the housing ring 34" illustratively includes a plateaued tip compressing the flange 31". This embodiment differs from the previous embodiment in that the flange 31" includes an upper (outer) surface that is raised. Moreover, and perhaps as best seen in FIG. 5B, the flange 31" is illustratively compressed between the backing member 35" and the plateaued tip housing ring 34" to define the seal without adhesive material.

Figure 6A:
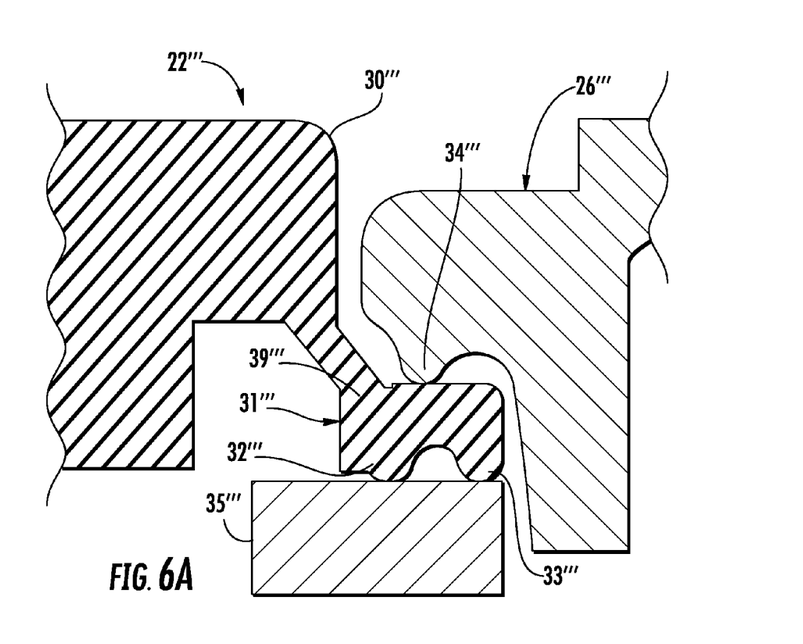
FIG. 6A is a cross-sectional view of a portion of another embodiment of the elastomeric switch membrane according to the present invention in an uncompressed state.
Figure 6B:
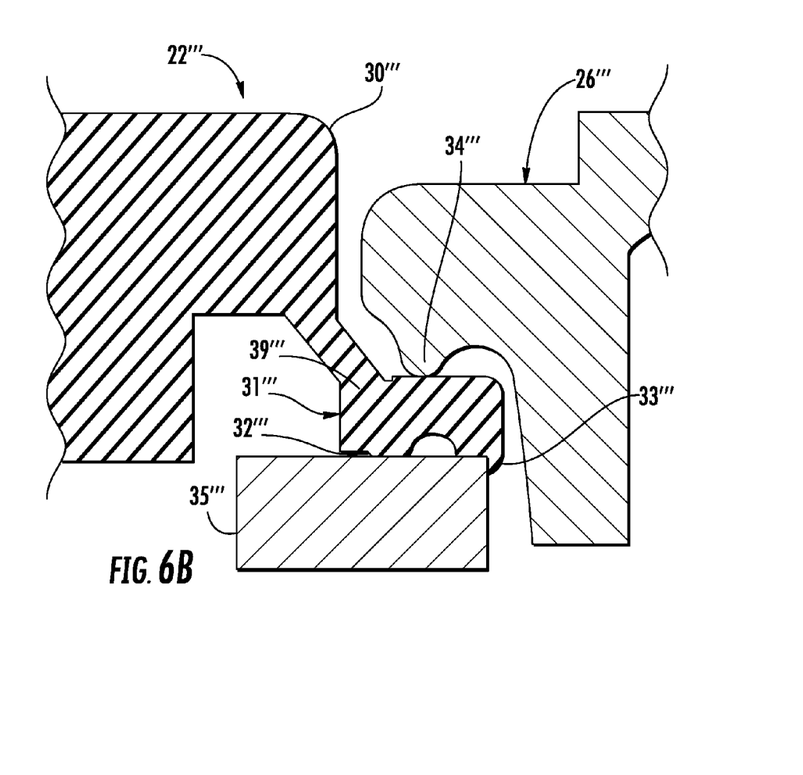
FIG. 6B is a cross-sectional view of a portion of another embodiment of the elastomeric switch membrane according to the present invention in a compressed state.

Referring now to FIGS. 6A and 6B, another embodiment of the wireless communications device 20''' is now described. In this embodiment of the wireless communications device 20''', those elements already discussed above with respect to FIGS. 1-3B are given triple prime notation and most require no further discussion herein. This embodiment differs from the previous embodiment in that the flange 31''' includes an upper (outer) surface that is raised. Further, the inner flange ring 32''' and the outer flange ring 33''' each have respective identical heights measured from the bottom (inner) surface. Moreover, and perhaps as best seen in FIG. 6B, the flange 31''' is illustratively compressed between the backing member 35''' and the housing ring 34''' to define the seal without adhesive material.

Figure 7A:
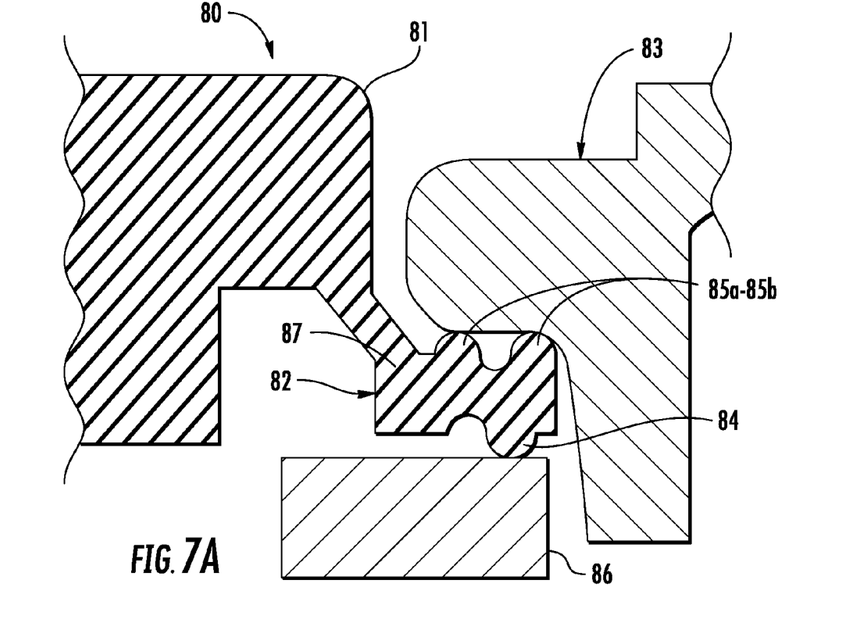
FIG. 7A is a cross-sectional view of a portion of another embodiment of the elastomeric switch membrane according to the present invention in an uncompressed state.
Figure 7B:
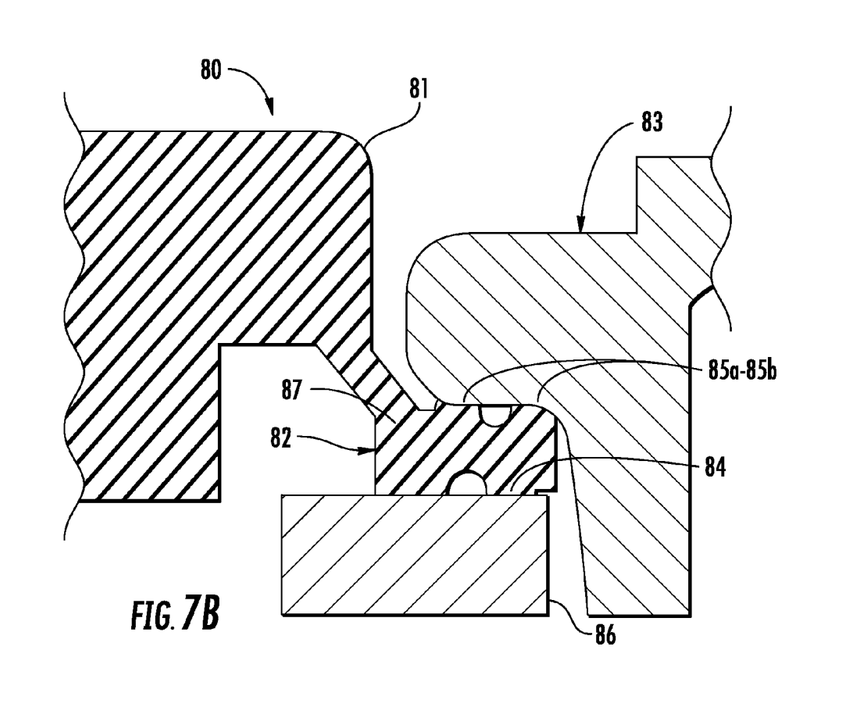
FIG. 7B is a cross-sectional view of a portion of another embodiment of the elastomeric switch membrane according to the present invention in a compressed state.

Referring now to FIGS. 7A and 7B, another embodiment of the wireless communications device 20 is now described. This embodiment of the wireless communications device 20 illustratively includes a housing 83 having an opening 48a-48d therein, at least one switch 49a-49d carried by the housing and being aligned with the opening, a backing member 86 within the housing adjacent the opening, and an elastomeric switch membrane 80 comprising a body 81 covering the at least one switch, and a flange 82 coupled to the body and compressed between the backing member and adjacent portions of the housing to define a seal therewith. The flange 82 illustratively includes a flange base 87 and a first flange ring 84 on a first surface (inner surface) thereof, and a pair of second flange rings 85a-85b on a second surface (outer surface) of the flange base and defining a valley therebetween aligned with the first ring flange. Further, and perhaps as best seen in FIG. 7B, the flange 82 is illustratively compressed between the backing member 86 and the adjacent portions of the housing 83 to define the seal without adhesive material.

In this particular embodiment, the pair of second flange rings 85a-85b is formed on the upper (outer) surface of the flange base 87, i.e. the pair of second flange rings cooperates/contacts with the adjacent portions of the housing 83 to compress the flange 82. The first flange ring 84 is formed on the bottom (inner) surface of the flange base 87, i.e. the first flange ring cooperates/contacts with the backing member 86 to compress the flange 82. In this embodiment, each flange ring 84-85 illustratively includes a respective identical height, but may alternatively have differing heights.

Figure 8A:
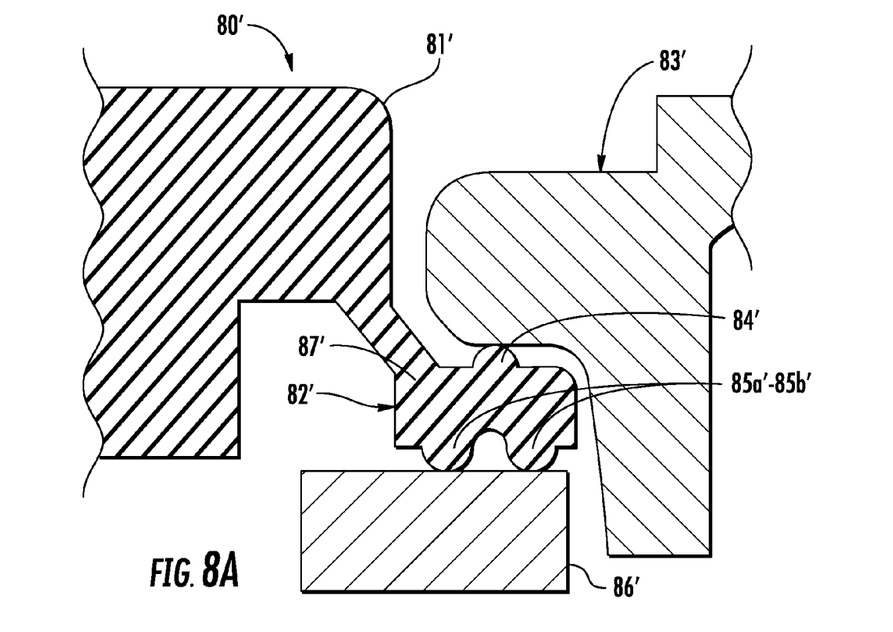
FIG. 8A is a cross-sectional view of a portion of another embodiment of the elastomeric switch membrane according to the present invention in an uncompressed state.
Figure 8B:
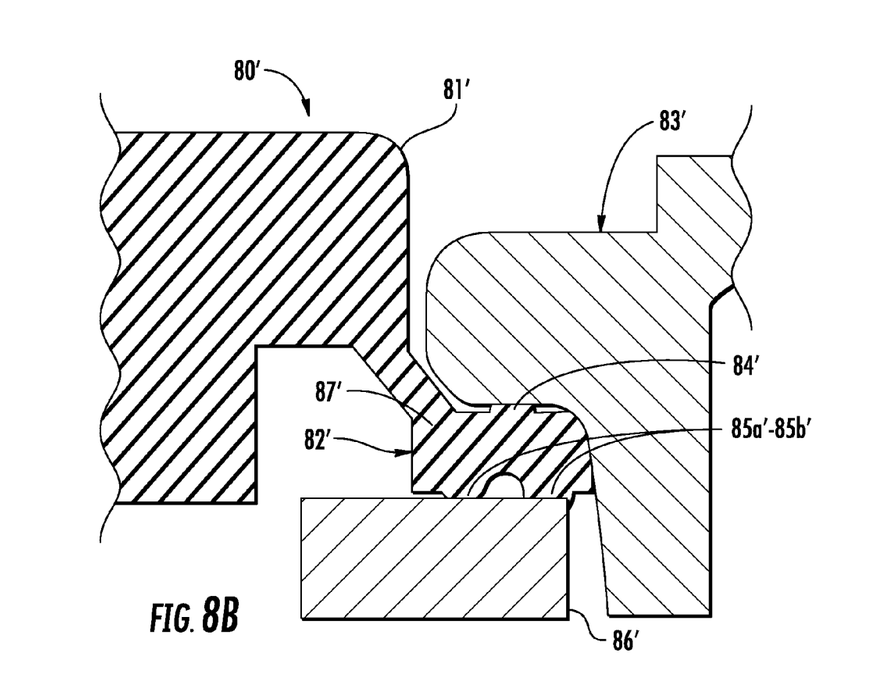
FIG. 8B is a cross-sectional view of a portion of another embodiment of the elastomeric switch membrane according to the present invention in a compressed state.

Referring now to FIGS. 8A and 8B, another embodiment of the elastomeric switch membrane 80' is now described. In this embodiment of the elastomeric switch membrane 80', those elements already discussed above with respect to FIGS. 7A-7B are given prime notation and most require no further discussion herein. This embodiment differs from the previous embodiment in that the pair of second flange rings 85a'-85b' are formed on the bottom (inner) surface of the flange base 87' and may cooperate/contact with the backing member 86' to compress the flange 82'. Also, the first flange ring 84' is formed on the upper (outer) surface of the flange base 87' and cooperates/contacts with the adjacent portions of the housing 83' to compress the flange 82'. In this embodiment, each flange ring 84'-85' illustratively includes a respective identical height, but may alternatively have differing heights.

Another aspect is directed to a method of making a mobile wireless communications device 20 that may comprise forming a housing 26 having an opening 48a-48d therein and an inwardly extending housing ring 34 adjacent the opening, positioning at least one switch 49a-49d to be carried by the housing and to be aligned with the opening, and positioning a backing member 35 within the housing adjacent the opening. The method may further include forming an elastomeric switch membrane 22 comprising a body 30 to cover the at least one switch 49a-49d, and a flange 31 coupled to the body and comprising a flange base 39, and a pair of flange rings 32-33 extending inwardly from the flange base and defining a valley therebetween aligned with the housing ring 34. The method may further include compressing the flange 31 between the backing member 35 and the housing ring 34 to define a seal therewith.

Another aspect is directed to a method of making a mobile wireless communications device 20 that may comprise providing a housing 83 having an opening 48a-48d therein, positioning at least one switch 49a-49d to be carried by the housing and to be aligned with the opening, and positioning a backing member 86 within the housing adjacent the opening. The method may further include forming an elastomeric switch membrane 80 comprising a body 81 to cover the at least one switch 49a'-49d', and a flange 82 coupled to the body and comprising a flange base 87 and a first flange ring 84 on a first surface thereof, and a pair of second flange rings 85a-85b on a second surface of the flange base and defining a valley therebetween aligned with the first ring. The method may further include compressing the flange 82 between the backing member 86 and adjacent portions of the housing 83 to define a seal therewith.

Figure 9:
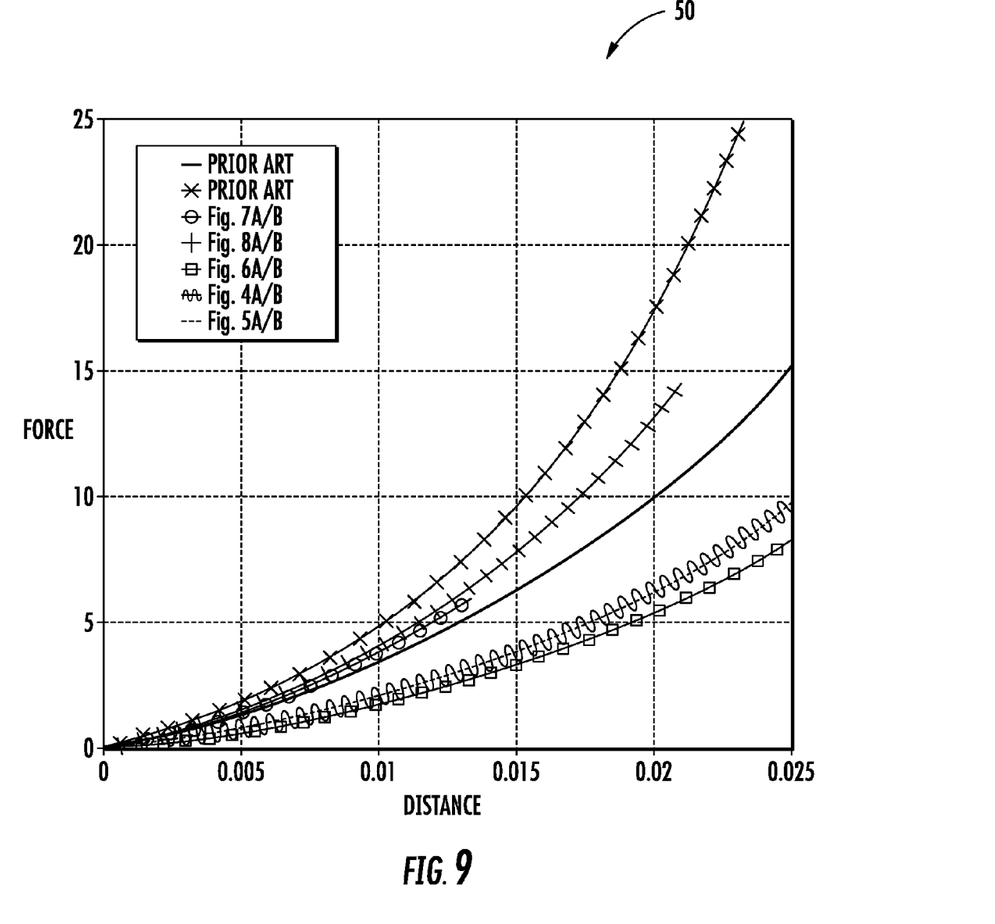
FIG. 9 is a chart showing applied compression force versus distance compressed for the elastomeric switch membrane according to the present invention and according to the prior art.
Figure 10:
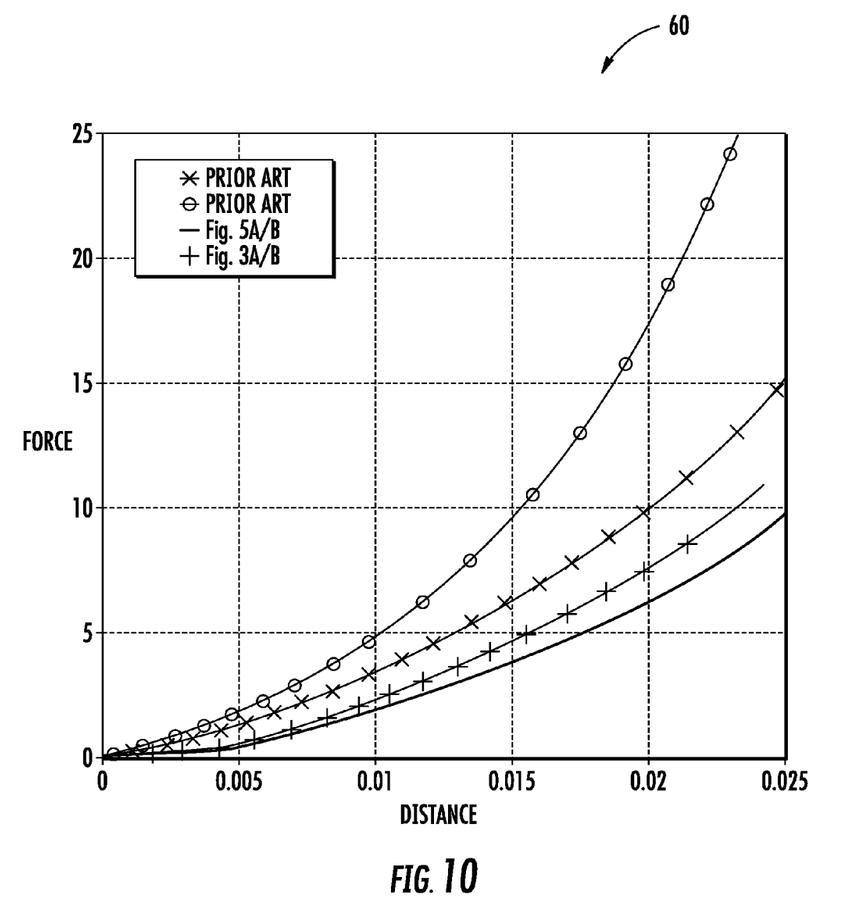
FIG. 10 is another chart showing applied compression force versus distance compressed for the elastomeric switch membrane according to the present invention and according to the prior art.
Figure 11:
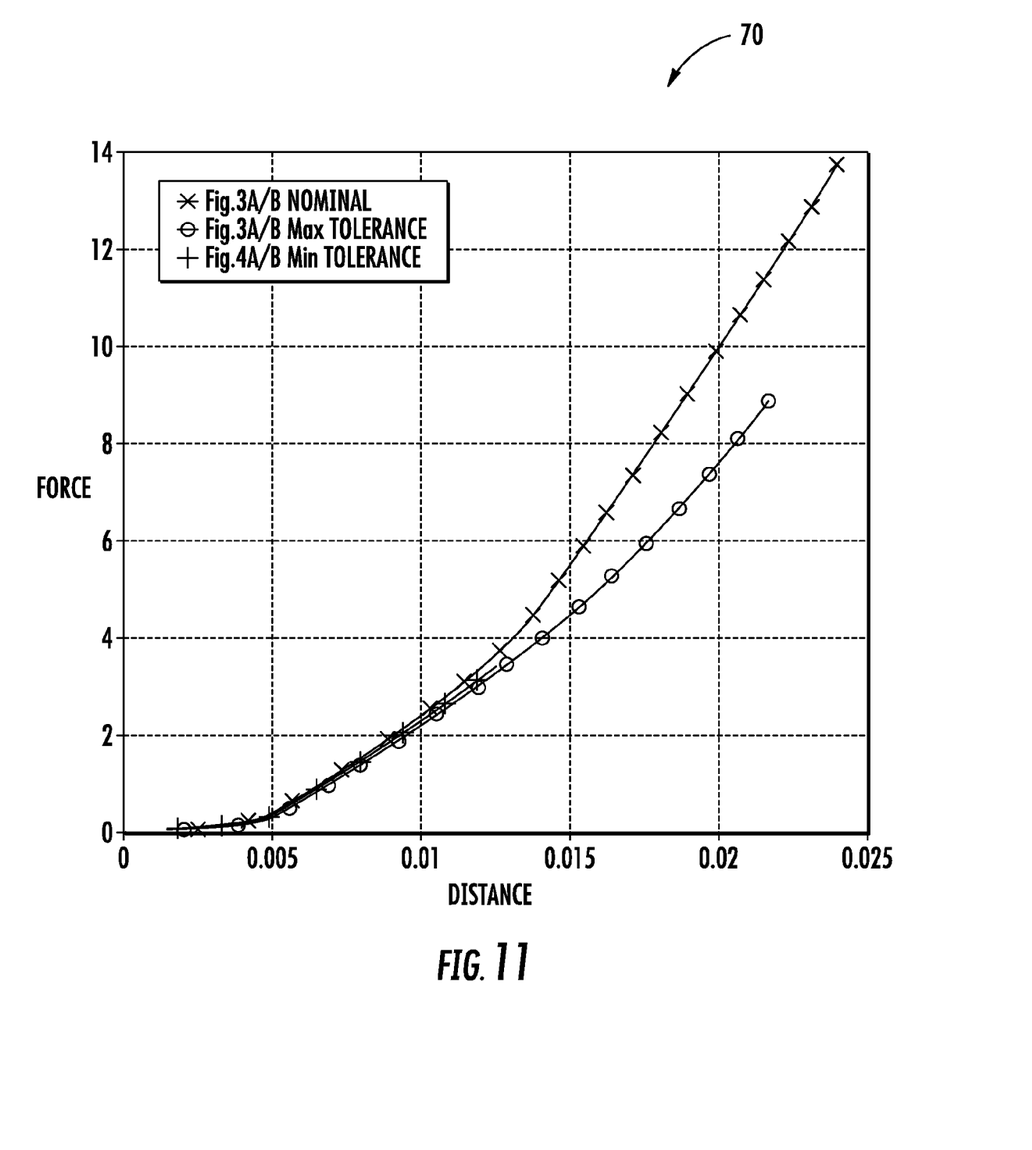
FIG. 11 is a chart showing applied compression force versus distance compressed for the elastomeric switch membrane according to the present invention.

Referring to FIGS. 9-11, diagrams 50, 60, 70 respectively illustrate compression force versus compression distance into the flange of the respective elastomeric switch membrane. The diagrams 50, 60, 70 illustrate this data for each of the above disclosed embodiments and the prior art elastomeric switch membrane. As will be appreciated by those skilled in the art, the embodiments of the elastomeric switch membrane 22a-22d disclosed herein provide considerable compression distance for less applied force than the prior art elastomeric switch membrane.

Moreover and as will be appreciated by those skilled in the art, the embodiments of the elastomeric switch membrane disclosed herein are readily installed into the wireless mobile communications device 20 without the time and cost intensive application of adhesive material. Also, since the adhesive material of the typical elastomeric switch membrane degrades overtime, the herein disclosed elastomeric switch membrane 22a-22d provides better reliability. Moreover, the mobile wireless communications device 20 is readily serviced after manufacture since the housing 26 and the elastomeric switch membrane 22a-22d can be removed and reassembled with little effort, unlike the prior art adhesive based elastomeric switch membrane.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A mobile wireless communications device comprising:
   a housing having an opening therein and an inwardly extending housing ring adjacent said opening;
   at least one switch carried by said housing and being aligned with said opening;
   a backing member within said housing adjacent said opening; and
   an elastomeric switch membrane comprising a body covering said at least one switch, and a flange coupled to said body and compressed between said backing member and said housing ring to define a seal therewith;
   said flange comprising
      a flange base, and
      a pair of flange rings extending inwardly from said flange base and defining a valley therebetween aligned with said housing ring.

2. The mobile wireless communications device according to claim 1 wherein said flange being compressed between said backing member and said housing ring defines the seal without adhesive material.

3. The mobile wireless communications device according to claim 1 wherein said pair of flange rings comprises an inner flange ring and an outer flange ring, each having a respective height; and wherein said outer flange ring has a height greater than a height of said inner flange ring.

4. The mobile wireless communications device according to claim 1 wherein said pair of flange rings comprises an inner flange ring and an outer flange ring, each having respective identical heights.

5. The mobile wireless communications device according to claim 1 wherein said housing ring has a rounded tip compressing said flange.

6. The mobile wireless communications device according to claim 1 wherein said housing ring has a plateaued tip compressing said flange.

7. The mobile wireless communications device according to claim 1 wherein said flange base has a rounded corner portion; and wherein said housing has a recess shaped to receive the rounded corner portion therein.

8. The mobile wireless communications device according to claim 1 wherein said elastomeric switch membrane comprises an integrally molded monolithic unit.

9. The mobile wireless communications device according to claim 1 wherein said at least one switch comprises an array thereof.

10. The mobile wireless communications device according to claim 1 wherein said at least one switch comprises at least one push-to-talk (PTT) switch.

11. A mobile wireless communications device comprising:
    a housing having an opening therein and an inwardly extending housing ring adjacent said opening, said housing ring having a rounded tip;
    at least one switch carried by said housing and being aligned with said opening;
    a backing member within said housing adjacent said opening; and
    an elastomeric switch membrane comprising a body covering said at least one switch, and a flange coupled to said body and compressed between said backing member and said housing ring to define a seal therewith;
    said flange comprising
       a flange base, and
       an inner and an outer flange ring extending inwardly from said flange base and defining a valley therebetween aligned with said housing ring,
       said outer flange ring having a height greater than a height of said inner flange ring.

12. The mobile wireless communications device according to claim 11 wherein said flange being compressed between said backing member and said housing ring defines the seal without adhesive material.

13. The mobile wireless communications device according to claim 11 wherein said flange base has a rounded corner portion; and wherein said housing has a recess shaped to receive the rounded corner portion therein.

14. The mobile wireless communications device according to claim 11 wherein said elastomeric switch membrane comprises an integrally molded monolithic unit.

15. A mobile wireless communications device comprising:
a housing having an opening therein;
at least one switch carried by said housing and being aligned with said opening;
a backing member within said housing adjacent said opening; and
an elastomeric switch membrane comprising a body covering said at least one switch, and a flange coupled to said body and compressed between said backing member and adjacent portions of said housing to define a seal therewith;
said flange comprising
a flange base and a first flange ring on a first surface thereof, and
a pair of second flange rings on a second surface of said flange base and defining a valley therebetween aligned with said first flange ring.

16. The mobile wireless communications device according to claim 15 wherein said flange being compressed between said backing member and the adjacent portions of said housing defines the seal without adhesive material.

17. The mobile wireless communications device according to claim 15 wherein said first flange ring contacts said backing member; and wherein said pair of second flange rings contacts the adjacent portions of said housing.

18. The mobile wireless communications device according to claim 15 wherein said pair of second flange rings contacts said backing member; and wherein said first flange ring contacts the adjacent portions of said housing.

19. The mobile wireless communications device according to claim 15 wherein each flange ring has a respective identical height.

20. The mobile wireless communications device according to claim 15 wherein said at least one switch comprises an array thereof.

21. The mobile wireless communications device according to claim 15 wherein said at least one switch comprises at least one push-to-talk (PTT) switch.

22. A method of making a mobile wireless communications device comprising:
forming a housing having an opening therein and an inwardly extending housing ring adjacent the opening;
forming an elastomeric switch membrane comprising a body to cover at least one switch aligned with the opening, and a flange coupled to the body and comprising a flange base, and a pair of flange rings extending inwardly from the flange base and defining a valley therebetween aligned with the housing ring; and
compressing the flange between a backing member and the housing ring to define a seal therewith.

23. The method according to claim 22 wherein compressing of the flange between the backing member and the housing ring further comprises defining the seal without adhesive material.

24. The method according to claim 22 wherein forming the elastomeric switch membrane comprises forming the pair of flange rings to comprise an inner flange ring and an outer flange ring; and wherein a height of the outer flange ring is greater than a height of the inner flange ring.

25. The method according to claim 22 wherein forming the elastomeric switch membrane comprises forming the pair of flange rings to comprise an inner flange ring and an outer flange ring, each having respective identical heights.

26. The method according to claim 22 wherein forming the elastomeric switch membrane comprises integrally molding the elastomeric switch membrane as a monolithic unit.

27. The method according to claim 22 wherein forming the housing comprises forming the housing ring having a rounded tip for compressing the flange.

28. The method according to claim 22 wherein forming the housing comprises forming the housing ring having a plateaued tip for compressing the flange.

29. A method of making a mobile wireless communications device comprising:
forming a housing having an opening therein;
forming an elastomeric switch membrane comprising a body to cover at least one switch aligned with the opening, and a flange coupled to the body and comprising a flange base and a first flange ring on a first surface thereof, and a pair of second flange rings on a second surface of the flange base and defining a valley therebetween aligned with the first flange ring; and
compressing the flange between a backing member and adjacent portions of the housing to define a seal therewith.

30. The method according to claim 29 wherein compressing of the flange between the backing member and the adjacent portions of the housing further comprises defining the seal without adhesive material.

31. The method according to claim 29 wherein compressing of the flange between the backing member and the adjacent portions of the housing further comprises the first flange ring contacting the backing member, and the pair of second flange rings contacting the adjacent portions of the housing.

32. The method according to claim 29 wherein compressing of the flange between the backing member and the adjacent portions of the housing further comprises the pair of second flange rings contacting the backing member, and the first flange ring contacting the adjacent portions of the housing.

33. The method according to claim 29 wherein forming the elastomeric switch membrane comprises integrally molding the elastomeric switch membrane as a monolithic unit.

34. The method according to claim 29 wherein forming of the elastomeric switch membrane comprises forming each flange ring to have a respective identical height.

* * * * *